US008720633B2

(12) United States Patent
Grutter et al.

(10) Patent No.: US 8,720,633 B2
(45) Date of Patent: May 13, 2014

(54) ALL WHEEL DRIVE SPEED SYNCHRONIZATION AND CONNECTION

(75) Inventors: Peter J. Grutter, Plymouth, MI (US); Andreas E. Perakes, Canton, MI (US); Nicholas E. McCubbin, Farmington Hills, MI (US); Ashok E. Rodrigues, Farmington Hills, MI (US); Robert S. Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 12/891,871

(22) Filed: Sep. 28, 2010

(65) Prior Publication Data

US 2012/0073929 A1    Mar. 29, 2012

(51) Int. Cl.
*B60K 17/35* (2006.01)

(52) U.S. Cl.
USPC .............. 180/248; 180/233; 180/249; 701/89

(58) Field of Classification Search
USPC .............................. 180/233, 248, 249; 701/89
See application file for complete search history.

(56) References Cited

U.S. PATENT DOCUMENTS

| | | | |
|---|---|---|---|
| 5,105,900 A | | 4/1992 | Adler et al. |
| 5,105,902 A | | 4/1992 | Wilson et al. |
| 5,390,560 A | * | 2/1995 | Ordo ................................ 74/329 |
| 5,411,110 A | | 5/1995 | Wilson et al. |
| 5,448,478 A | | 9/1995 | Eto |
| 5,492,194 A | | 2/1996 | McGinn et al. |
| 5,680,794 A | * | 10/1997 | Wake ............................... 74/335 |
| 5,702,321 A | * | 12/1997 | Bakowski et al. ............ 475/199 |
| 5,762,578 A | * | 6/1998 | Forsyth ......................... 475/198 |
| 5,799,748 A | | 9/1998 | Origuchi |
| 5,803,197 A | | 9/1998 | Hara et al. |
| 6,186,258 B1 | | 2/2001 | Deutschel et al. |
| 6,493,624 B2 | | 12/2002 | Nishida et al. |
| 6,554,731 B2 | * | 4/2003 | Brown et al. ................. 475/204 |
| 6,579,204 B2 | * | 6/2003 | Brown et al. ................. 475/204 |
| 6,712,725 B2 | * | 3/2004 | Uchino ......................... 475/119 |
| 6,834,225 B1 | * | 12/2004 | Jiang et al. ...................... 701/67 |
| 7,140,460 B2 | | 11/2006 | Shimizu et al. |
| 7,175,558 B2 | * | 2/2007 | Puiu et al. .................... 475/225 |
| 7,294,086 B2 | * | 11/2007 | Brissenden et al. .......... 475/231 |
| 7,434,646 B2 | | 10/2008 | Thompson et al. |
| 7,533,754 B2 | | 5/2009 | Burrows et al. |
| 7,594,560 B2 | * | 9/2009 | Homan et al. ................ 180/233 |
| 2005/0045401 A1 | * | 3/2005 | Wood et al. .................. 180/248 |
| 2005/0204838 A1 | * | 9/2005 | DeGraffenreid ................ 74/329 |
| 2009/0057047 A1 | | 3/2009 | Beechie et al. |
| 2010/0038164 A1 | * | 2/2010 | Downs et al. ................ 180/248 |
| 2010/0044138 A1 | * | 2/2010 | Marsh et al. ................. 180/247 |

FOREIGN PATENT DOCUMENTS

GB    2407804 A    11/2005

* cited by examiner

*Primary Examiner* — Joseph M Rocca
*Assistant Examiner* — Michael Stabley
(74) *Attorney, Agent, or Firm* — Jason Rogers; MacMillan, Sobanski & Todd, LLC

(57) ABSTRACT

A vehicle driveline includes a power source, a transmission connected to the power source and including an output driveably connected to primary road wheels, a driveshaft, a synchronizer that opens and closes a drive connection between the output and the driveshaft, and a clutch that alternately opens and closes a drive connection between the driveshaft and secondary road wheels. A control executes synchronization and connection strategies using one of singular, overlapping and sequential activation of the driveline components that produce all-wheel-drive on-demand.

11 Claims, 4 Drawing Sheets

ALL WHEEL DRIVE SPEED SYNCHRONIZATION AND CONNECTION

BACKGROUND OF THE INVENTION

1. Field of the Invention

This invention relates generally to a motor vehicle driveline, particularly to a driveline in which primary wheels are connected continually to a power source and secondary wheels are connected selectively to the power source.

2. Description of the Prior Art

All-wheel-drive (AWD) systems tend to degrade vehicle fuel economy due to increased driveline parasitic losses even when AWD is not activated. These parasitic losses occur because some parts of the driveline continue to be driven by the engine and transmission, or the secondary drive wheels and their rotation cause a drag torque to be exerted on the driving element.

Driveline disconnect systems improve fuel economy by disconnecting as many of the driveline rotating parts as possible, as close to the transmission output and the secondary drive wheels as possible, when all-wheel-drive is not activated.

These disconnect systems provide a significant fuel economy benefit, but they pose challenges including (i) getting the driveline reconnected quickly when the AWD system must be activated, and (ii) maintaining system durability through many driveline disconnect/reconnect cycles. Meeting these challenges is complicated when some or all of the disconnect clutch or synchronizer designs are constrained by size and packaging limitations, or a desire to minimize drag. These constraints work against the characteristics required to provide fast and durable disconnect systems.

In the case of a front-wheel drive (FWD) based AWD vehicle, the initial phase of front disconnect and reengagement is performed using a synchronizer having a limited torque capacity, which limits the speed at which it is able to synchronize undriven drivetrain components elements by bringing them back to the same speed as the elements which are already rotating. The small size of the synchronizer also makes providing good durability under these circumstances a challenge.

SUMMARY OF THE INVENTION

A FWD-based AWD vehicle driveline includes a power source, a transmission connected to the power source, a primary driveline output continuously connected to primary road wheels and a secondary driveline output selectively connected to secondary road wheels. The secondary driveline consists of a driveshaft, a power transfer unit (PTU) with a synchronizer that opens and closes a drive connection between the PTU output and the driveshaft, and a rear drive unit (RDU) with a clutch that alternately opens and closes a drive connection between the driveshaft and secondary road wheels. A control executes synchronization and connection strategies using one of singular, overlapping and sequential activation of the driveline components that produce all-wheel-drive on-demand.

The driveline is controlled to produce all-wheel drive operation by using a clutch of a RDU to accelerate driveline components toward a speed of secondary wheels, disengaging the clutch (partially or completely), using a PTU synchronizer to accelerate the components toward a speed of a transmission output, engaging the synchronizer to transmit torque between the transmission output and the clutch, and reengaging the clutch to drive all wheels as needed.

The transmitted portion of the transmission output torque quickly accelerates those driveline components that are stationary when the AWD disconnects are in the disconnected state. Use of the RDU clutch to perform this function also reduces the demands on the PTU synchronizer, thereby increasing its service life.

To minimize to an acceptable level any loss of traction on the secondary wheels due to engagement of the RDU clutch, the AWD controller may receive constraints from a vehicle controller, such as a brake system controller, which limits the torque capacity of the RDU clutch 46 or limits the rate of change of RDU clutch torque capacity.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
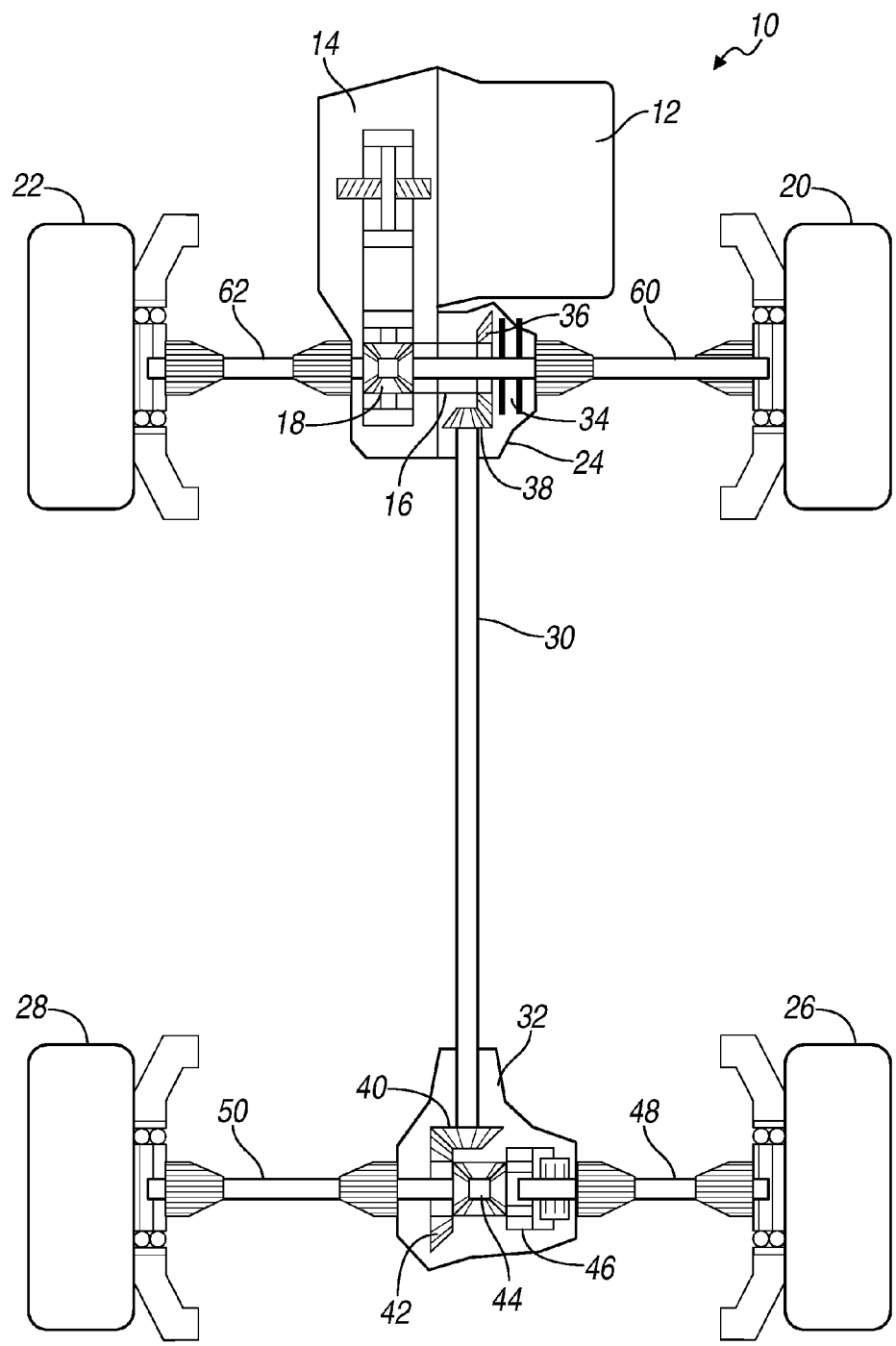
FIG. 1 is a schematic diagram of a motor vehicle driveline having primary and secondary road wheels.

The driveline 10 of FIG. 1 includes a power source 12, such as an internal combustion engine or an electric motor, and a transmission 14 that produces a variable ratio between the speed of its output 16, which is continually driveably connected through a differential mechanism 18 to the primary road wheels 20, 22, and the speed of the transmission input, which is driveably connected to the power source.

The primary wheels 20, 22 are connected continually to the engine through the transmission. The secondary wheels 26, 28 are undriven road wheels, except that they are connected to the engine when AWD is operating.

A power transfer unit (PTU) 24 transmits power from the transmission output 16 selectively to the secondary road wheels 26, 28. A driveshaft 30 transmits rotating power from the PTU 24 to a rear drive unit (RDU) 32.

The PTU 24 comprises a coupler 34, such as a clutch or synchronizer, whose input is driveably connected to the transmission output 16; a bevel ring gear 36 connected to the output of the PTU coupler 34, and a bevel pinion gear 38 meshing with the bevel ring gear 36 and connected to driveshaft 30. The PTU coupler 34 disconnects the rotating components of the PTU and driveline components downstream of the PTU from the transmission output 16.

The RDU 32 includes a bevel pinion gear 40, secured to driveshaft 30; a bevel ring gear 42, meshing with pinion 40, a differential mechanism 44, and a low-drag coupling 46. The secondary wheels 26, 28 are driven by halfshafts 48, 50 though coupling 46 and differential 44. Coupling 46 alternately connects and disconnects halfshafts 48, 50 from the rotatable components of the RDU 32.

Figure 2:
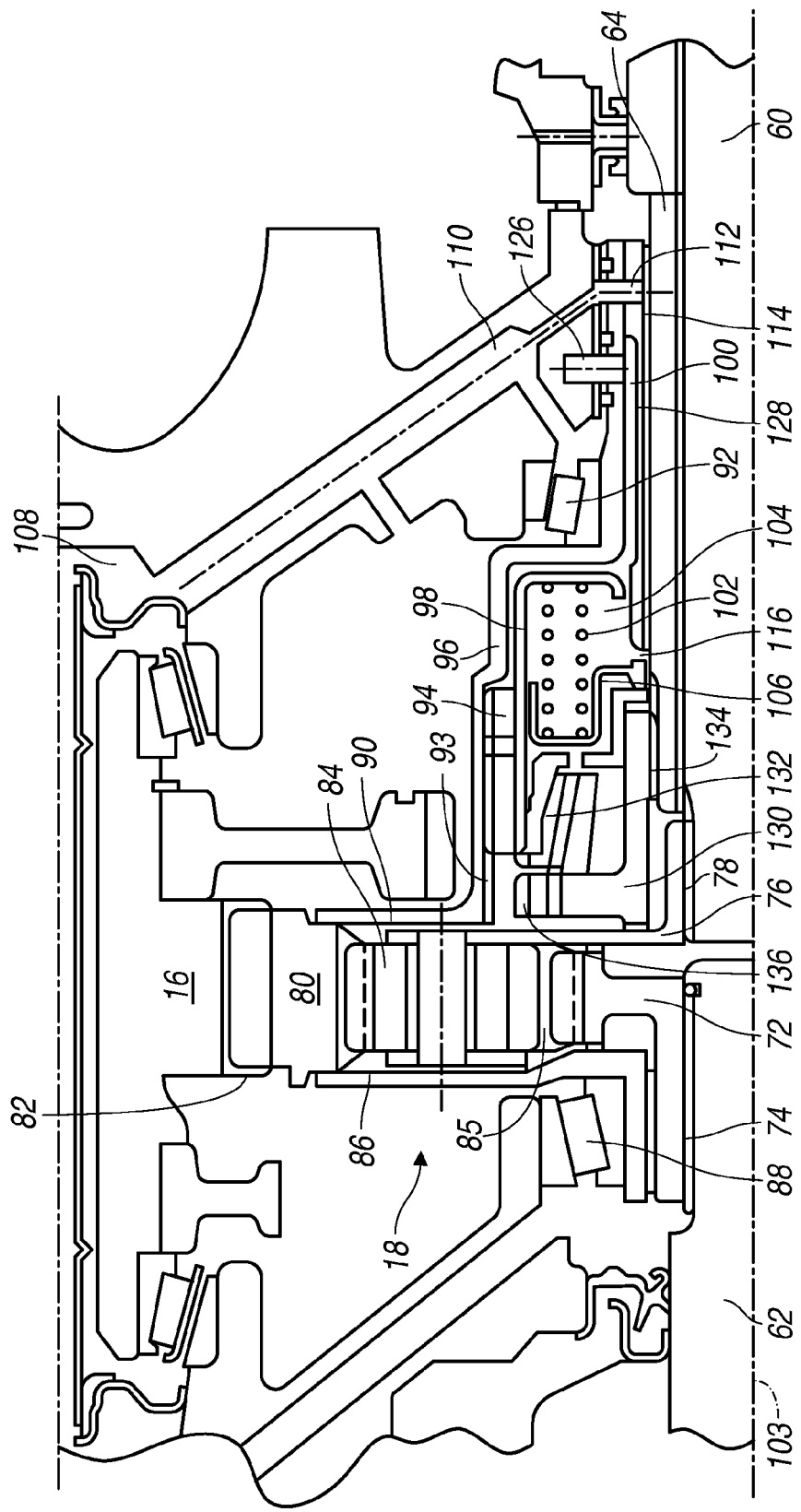
FIG. 2 is a cross section showing a drive system that connects a power source continually to a primary wheel set and selectively to a secondary wheel set.

FIG. 2 illustrates details of the power path that connects the transmission output 16 continually to the halfshafts 60, 62 for the primary wheels 20, 22 through differential 18, and to the PTU input shaft 64, which is connected to bevel ring gear 36.

A compound planetary differential 180 includes a sun gear 72, secured through a spline 74 to axle shaft 62; a carrier 76, secured through a spline 78 to axle shaft 60; a ring gear 80, engaged with an pinion 82 formed on the transmission output shaft 16; first planet pinions 84 supported on the carrier and meshing with the ring gear 80; and second planet pinions 85 supported on the carrier 76 and meshing with the sun gear 72 and the first planet pinions 84. One side of ring gear 80 is secured to a disc 86 and supported at a bearing 88; the other side of ring gear 80 is secured to a disc 90 and supported at a bearing 92. Disc 90 is formed with an internal spline 93, which engages an external spline formed on a coupler sleeve 94.

Disc 90 forms a cylinder 96, which contains a piston 98, actuated by pressurized hydraulic fluid carried to cylinder 96 through a passage 100. A compression return spring 102 restores piston 98 to the disengaged position shown in the FIG. 2. Piston 98 is secured to coupler sleeve 94 such that they move along an axis 103 and rotate about the axis as a unit.

The volume 104 enclosed by piston 98 and spring retainer 106 forms a balance dam containing hydraulic fluid supplied from source of hydraulic lubricant 108 through a lube circuit, which includes passages 110, 112, 114, 116.

In operation, fluid from a source of line pressure is carried to a valve, which is controlled by a variable force solenoid. The valve opens and closes a connection between the line pressure source and passages 126, 128, which carry piston-actuating pressure to cylinder 96 depending on the state of the solenoid. When passages 126 and 128 are pressurized, piston 98 and coupler sleeve 94 move leftward, causing frictional contact at the conical surface between a member 130 and a synchronizing ring 132. Member 130 is rotatably secured by spline 134 to PTU input shaft 64. As the speed of member 130 is synchronized with the speed of ring gear 80, the internal spline of coupler sleeve 94 engages the dog teeth on synchronizing ring 132 and the clutch teeth 136 on the radial outer surface of connecting member 130, thereby driveably connecting ring gear 80 and PTU input shaft 64.

When passages 126 and 128 are vented, piston 98 and sleeve 94 move rightward to their disengaged positions, causing connecting member 130 to disengage the ring gear 80, thereby disconnecting ring gear 80 from PTU input shaft 64.

Although the description refers to the speed of connecting member 130 being synchronized with the speed of ring gear 80 using a synchronizer, a connection between ring gear 80 and PTU input shaft 64 can be completed using a coupler, such as a clutch, instead of a synchronizer.

In the disconnected state, the RDU coupling 46 and PTU coupling 34 are open, causing the rotatable RDU components, driveshaft 30, and rotatable PTU components to be disconnected from the secondary wheels 26, 28 and halfshafts 48, 50.

In the connected state, the PTU coupler 34 is closed, causing driveshaft 30 to rotate with the primary wheels 20, 22 and transmission output 16. The RDU coupling 46 has a variable torque transmitting capacity, which may produce a fully engaged connection or slip between driveshaft 30 and the secondary wheels 26, 28, as required to produce AWD operation.

During synchronization of the secondary driveline, if the torque (and therefore the tractive effort) applied is too large, the resulting vehicle deceleration may be perceptible to the vehicle occupants, or the tractive force being exerted may cause loss of traction on a surface having a low coefficient of friction. Care must therefore be taken to avoid undesirable effects from these conditions.

To bring all components rapidly up to speed and then quickly perform the AWD on-demand function, the control relies on the state of the vehicle including its vehicle speed, the ambient temperature, and the temperature and parasitic drag level of the various rotating components, including effects due to component break-in or aging, which should be accelerated. Based on this information, the control will execute one of the three following synchronization and connection strategies.

1. Singular Activation

When the vehicle is traveling at low speeds or otherwise requires a relatively low amount of power to synchronize the secondary driveline, the control uses only the PTU clutch 34 to accelerate the stationary components. In this case the PTU clutch 34 is a synchronizer, similar to that of a manual transmission, which transmits torque to driveshaft 30, thereby accelerating the driveshaft and synchronizing its speed with the speed of the transmission output 16. When the speed difference across the synchronizer 34 is sufficiently small, the synchronizer's sleeve engages the transmission output 16 allowing the synchronizer 34 to transmit transmission output torque to the RDU 32 through driveshaft 30. The secondary wheels 26, 28 are driven through coupling 46, differential 44 and halfshafts 48, 50.

2. Overlapping Activation

In the majority of speed synchronization and AWD reconnect events the PTU 24 and RDU 32 are activated concurrently during the event. During some portions of the event the PTU 24 may be solely activated; during other portions, the RDU 32 may be solely activated; during other portions, both may be activated.

The sequenced activation of both elements allows for the most desirable method for controlling the relative motion of various components to obtain the lowest level of NVH.

The use of both the PTU synchronizer 34 and RDU clutch 46 concurrently, which typically occurs during the middle portion of the event, allows the larger torque capacity of the RDU to more quickly accelerate the components to be synchronized, and also has been shown by vehicle testing to allow, with careful shaping of the RDU torque profile, to provide the best NVH reconnect events over most conditions.

When the accelerating components reach the speed of the slower activating element, i.e. PTU 24 or RDU 32, which is typically the RDU especially if the primary wheels 20, 22 are rotating faster than the secondary wheels 26, 28, the slower element is at least partially released, as its contribution to speed synchronization is largely completed.

During the end stages of the event, especially if the primary wheels 20, 22 are rotating faster than the secondary wheels 26, 28, an additional reason for reducing the torque capacity of the RDU coupling 46 is to prevent binding and allow the driveshaft 30 to come fully up to the speed of the primary wheels. This method also prevents potential overloading of PTU synchronizer 34 by the much higher torque capacity RDU coupling 46.

With the PTU synchronizer 34 still engaged, driveshaft 30 continues to approach the speed of the primary wheels 20, 22. When the speed difference across synchronizer 34 is sufficiently small, the synchronizer's sleeve engages the transmission output 16 allowing the synchronizer 34 to transmit transmission output torque to the RDU 32 through driveshaft 30.

The secondary wheels 26, 28 are driven through coupling 46, differential 44 and halfshafts 48, 50.

3. Sequential Activation

Under some high drag conditions, such as when ambient temperature is low and/or vehicle speed is very high, it is difficult for the PTU synchronizer 34, with its relatively low torque capacity compared to that of coupler 46, to significantly contribute to synchronizing the driveline. Due to the extended length of the synchronization and disconnect events when ambient temperature is low, durability of the PTU synchronizer 34 may be adversely affected. In this case, it is desirable that RDU clutch 46 perform the bulk of the speed synchronization.

The RDU clutch 46 is sized to provide on-demand AWD operation by transmitting a substantial portion of the transmission output torque to the secondary drive wheels 26, 28. This is more than enough to quickly accelerate, even in a high drag condition, those components of driveline 10 that are stationary when the AWD disconnects. Use of the RDU clutch 46 to perform this function also reduces the demands on the PTU synchronizer 34, thereby extending its useful life.

Using the RDU coupling 46 to synchronize the speed of stationary components to the speed of the secondary wheels 26, 28 is not a complete solution for quick re-engagement of AWD operation. If, due to wheel slip, the speed of the primary wheels 20, 22 is higher than the average secondary wheel speed, a speed difference exists across the PTU synchronizer 34 after the disconnected driveline components have been brought up to speed with wheels 26, 28.

For this reason the PTU synchronizer 34 must perform the final part of the synchronization and reconnect event. The RDU clutch 46 torque capacity is substantially reduced or eliminated, and with the PTU synchronizer now engaged, the driveshaft 30 continues to approach the speed of the primary wheels 20, 22. When the speed difference across synchronizer 34 is sufficiently small, the synchronizer's sleeve engages the transmission output 16 allowing the synchronizer 34 to transmit transmission output torque to the RDU 32 through driveshaft 30. The secondary wheels 26, 28 are driven through coupling 46, differential 44 and halfshafts 48, 50.

With respect to all those synchronization and connection strategies which make use of the RDU clutch, as described in the immediately preceding sections of this document, it can readily be appreciated that the RDU clutch 46 uses vehicle kinetic energy to bring the previously disconnected driveline components up to speed. The RDU clutch 46 accesses this kinetic energy by applying a braking force through the secondary drive wheels 26, 28 and their tractive effort on the road surface. If the braking torque and tractive effort is too large, the tractive force being exerted on wheels 26, 28 may cause loss of traction on a low coefficient of friction road surface. To minimize to an acceptable level any such loss of traction on the secondary wheels due to engagement of RDU clutch 46, the AWD controller may receive constraints from a vehicle controller, such as a brake system controller, which are used to limit the torque capacity of the RDU clutch 46, or to limit the rate of change of RDU clutch torque capacity.

Figure 3:
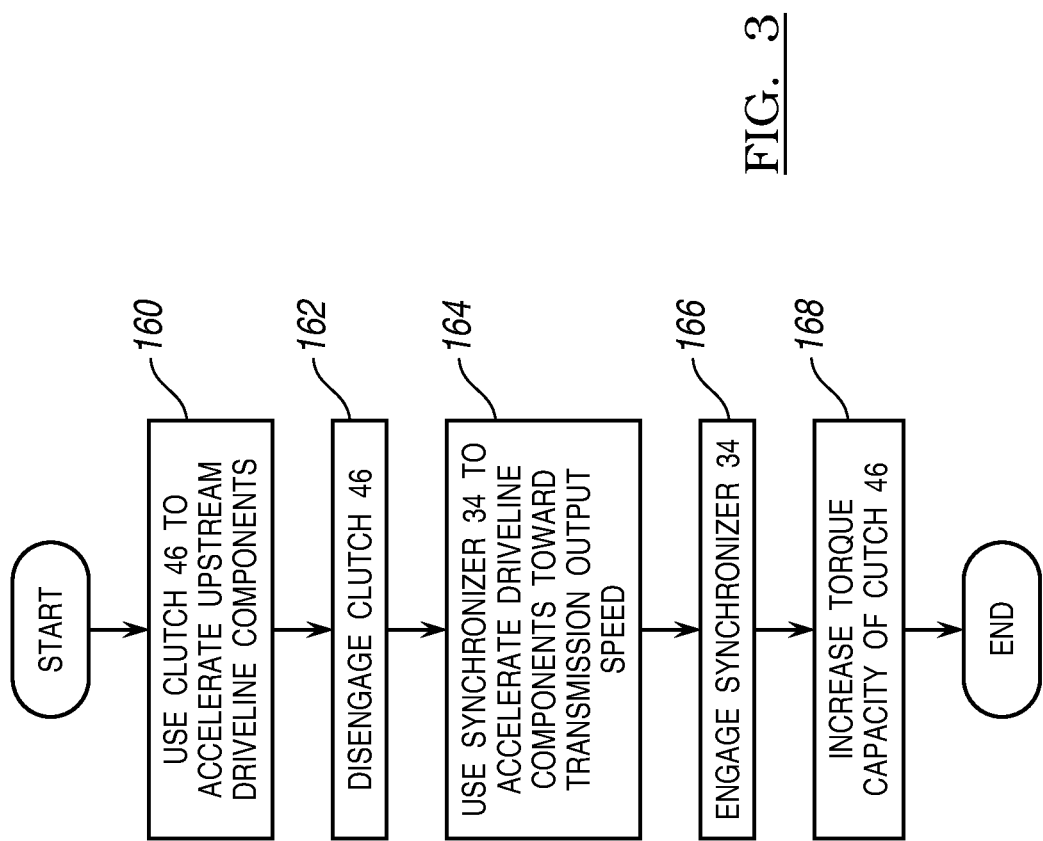
FIG. 3 is diagram showing the method steps for engaging all-wheel drive in the driveline of FIG. 1.

Referring now to FIG. 3, at step 160 of the method for engaging all-wheel drive operation of the vehicle driveline 10 clutch 46 is used to accelerate driveline components upstream of the clutch toward the speed of the secondary wheels 26, 28.

At step 162 clutch 46 is partially or completely disengaged.

At step 164 synchronizer 34 is used to accelerate driveline components toward the speed of the transmission output 16.

At step 166 synchronizer 34 is engaged to transmit torque between the transmission output 16 and clutch 46.

At step 168 the torque capacity of the clutch 46 is increased, and is made to vary as required for all-wheel drive operation.

Figure 4:
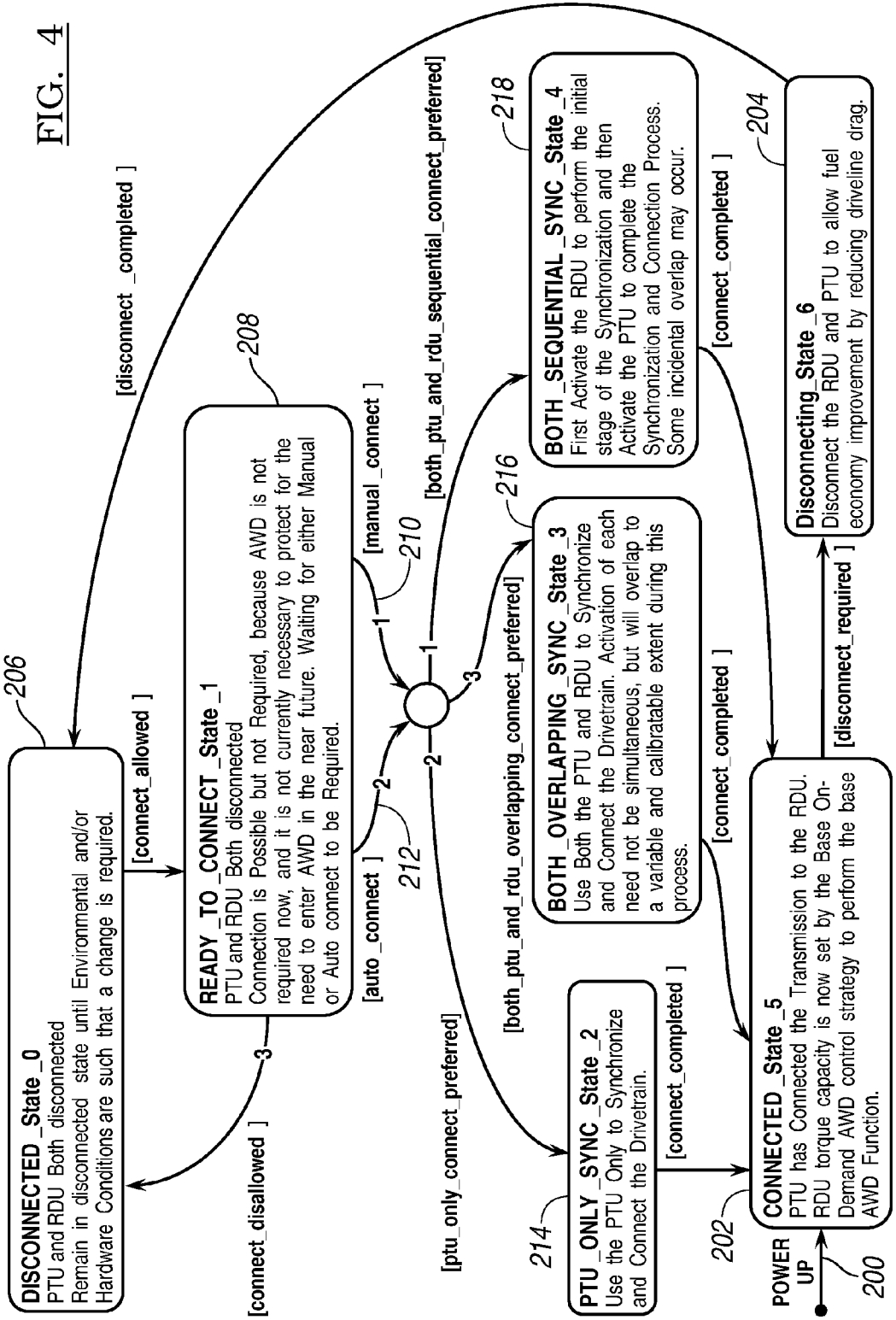
FIG. 4 is a state diagram of the method.

In order to further illustrate the sequence of actions which take place in the three synchronization and connection strategies that have been described above, reference is now made to FIG. 4, a diagram showing the various mutually exclusive states in which the control system can exist.

On initial power-up, the system is normally at step 200, and enters the CONNECTED state, at step 202, in which case the PTU has connected the transmission to the driveshaft and the RDU, and the system is capable of immediately performing the normal on-demand AWD function. The system will remain in this state until the condition 'disconnect_required' is true. This condition may be true if the vehicle operator has issued a manual disconnect command to maximize fuel economy or for other reasons, or if the auto_connect system has determined that conditions are appropriate to disconnect for the purpose of improving vehicle fuel economy. The auto_connect system monitors and models many current, past and predicted vehicle operating parameters and environmental conditions.

When the 'disconnect_required' condition is true, the system enters the DISCONNECTING state, at step 204. In this state, the RDU clutch torque capacity is decreased in a manner which produces both acceptable NVH and speed of response, until the torque capacity is low enough to allow the PTU to be disengaged without component damage or driveline shock.

When vehicle operating parameters indicate that the PTU has been disconnected, the 'disconnect_completed' condition is true, and the system transitions to the DISCONNECTED state, at step 206. It is possible, when in the disconnected state, that vehicle or environmental conditions do not permit the system to re-enter a connected state, even if the vehicle operator issues a manual connect command or if the auto_connect system has determined that conditions are appropriate to connect for the purpose of being prepared to quickly provide the on-demand AWD function. Under these circumstances, the system will remain in the DISCONNECTED state indefinitely.

If, however, vehicle and environmental conditions permit the system to enter the connected state when required by the manual or auto connect conditions, then the 'connect_allowed' condition is true, and the system transitions to the READY_TO_CONNECT state, at step 208. If, while the control system is in the READY_TO_CONNECT state, vehicle or environmental conditions change so that the connect state can no longer be permitted, then the 'connect_disallowed' condition is true, and the system transitions back to the DISCONNECTED state at step 206. While in the READY TO CONNECT state, the control system waits for either a manual connect command from the vehicle operator, or an auto connect command from the auto connect system. If either command is received, then the respective 'auto_connect' condition is true, at step 212, or the 'manual connect' condition' is true at step 212, and the control system leaves the READY TO CONNECT STATE and uses one of the three previously described methods to synchronize and connect the driveline.

At this time, the control system evaluates vehicle and environmental conditions to determine whether which of three mutually exclusive conditions is true: The mutually exclusive conditions are:

First, 'ptu_only_connect_preferred' (see the above description of the synchronization and connection strategy labeled as 'Singular Activation' for a summary of conditions which could make this condition true); or Second, 'both_ptu_and_rdu_overlapping_connect_preferred' (see the above description of the synchronization and connection strategy labeled as 'Overlapping Activation' for a summary of conditions which could make this condition true); or Third, 'both_ptu_and_rdu_sequential_connect_preferred' (see the above description of the synchronization and connection strategy labeled as 'Sequential Activation' for a summary of conditions which could make this condition true).

If 'ptu_only_connect_preferred' is true, then the system transitions to the PTU_ONLY_SYNC state, at step 214. While in this state, the control system performs the Singular Activation described earlier as synchronization and connection strategy number 1.

If 'both_ptu_and_rdu_overlapping_connect_preferred' is true, then the system transitions to the BOTH_OVERLAPPING_SYNC state, at step 216. While in this state, the control system performs the Overlapping Activation described earlier as synchronization and connection strategy number 2.

If 'both_ptu_rdu_sequential_connect_preferred' is true, then the system transitions to the BOTH_SEQUENTIAL_SYNC state, at step 218. While in this state, the control system performs the Sequential Activation described earlier as synchronization and connection strategy number 3.

In all of these states (steps 214, 216 and 218) the control system performs the appropriate synchronization and connection strategy until it determines that the connect action has completed. At that time, the 'connect_completed' condition is true, and the control system transitions to the 'CONNECTED' state at step 202.

In accordance with the provisions of the patent statutes, the preferred embodiment has been described. However, it should be noted that the alternate embodiments can be practiced otherwise than as specifically illustrated and described.

The invention claimed is:

1. A method for engaging all-wheel drive operation in a vehicle driveline, comprising:
   using a clutch of a rear-drive-unit to accelerate driveline components toward a speed of secondary wheels;
   disengaging the clutch;
   using a hydraulically-actuated synchronizer of a power-transfer unit to accelerate said components toward a speed of a transmission output;
   engaging the synchronizer to transmit torque between the transmission output and the clutch;
   increasing a torque capacity of the clutch.

2. The method of claim 1, further comprising limiting a torque transmitting capacity of the clutch.

3. The method of claim 1, further comprising limiting a rate of change of a torque transmitting capacity of the clutch.

4. A method for engaging all-wheel drive operation in a vehicle driveline, comprising:
   using a clutch of a rear-drive-unit to accelerate driveline components toward a speed of secondary wheels;
   using a synchronizer of a power-transfer unit to accelerate the components toward a speed of a transmission output;
   disengaging the clutch;
   engaging the synchronizer to transmit torque between the transmission output and the clutch;
   reengaging the clutch.

5. The method of claim 4, further comprising limiting a torque transmitting capacity of the clutch.

6. The method of claim 4, further comprising limiting a rate of change of a torque transmitting capacity of the clutch.

7. A method for engaging all-wheel drive operation in a vehicle driveline, comprising:
   using a hydraulically-actuated synchronizer of a power-transfer unit to accelerate driveline components toward a speed of a transmission output;
   using the synchronizer to transmit torque between the transmission output and a clutch of a rear-drive-unit;
   after speed synchronization occurs at the power-transfer unit occurs, engaging the clutch to transmit torque to secondary road wheels.

8. A vehicle driveline comprising:
   a planetary differential including an input;
   a transmission connected to the input and including an output driveably connected through the planetary differential to primary road wheels;
   a driveshaft;
   a hydraulically-actuated speed synchronizer that opens and closes a drive connection between the output and the driveshaft;
   a clutch that alternately opens and closes a drive connection between the driveshaft and secondary road wheels.

9. The driveline of claim 8, further comprising:
   a bevel ring gear secured to an output of the synchronizer;
   a bevel pinion gear meshing with the ring gear, the driveshaft connected to the pinion gear.

10. The driveline of claim 8, further comprising:
    a differential mechanism driveably connected to the transmission output for transmitting rotating power to the primary road wheels.

11. The driveline of claim 8, further comprising:
    a second differential mechanism driveably connected to an output of the clutch for transmitting rotating power to the secondary road wheels.

* * * * *